(No Model.)
G. GRAY.
PEGGING MACHINE.
No. 264,077. Patented Sept. 12, 1882.
Fig: 1.
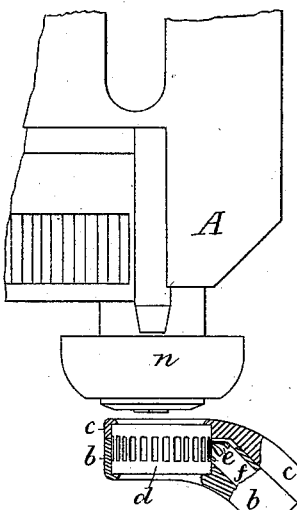
Fig: 2.
Fig: 4.
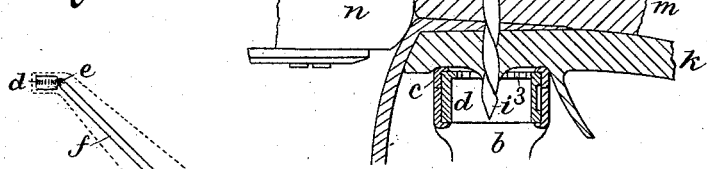
Fig: 3.
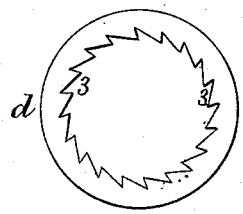
Witnesses.
Jos. P. Livermore
Fred A. Powell
Inventor.
Gorham Gray
by Crosby & Gregory
attys.

UNITED STATES PATENT OFFICE.

GORHAM GRAY, OF BOSTON, MASSACHUSETTS.

PEGGING-MACHINE.

SPECIFICATION forming part of Letters Patent No. 264,077, dated September 12, 1882.

Application filed June 26, 1882. (No model.)

*To all whom it may concern:*

Be it known that I, GORHAM GRAY, of Boston, county of Suffolk, State of Massachusetts, have invented an Improvement in Pegging-Machines, of which the following description, in connection with the accompanying drawings, is a specification.

My invention relates to pegging or nailing machines for boot and shoe work, and has for its object to produce more highly-finished work than can be done on machines heretofore in use.

The invention consists mainly in the combination, with the horn or support for the stock being operated upon, of a rotating toothed cutter or burr, by which the protruding end of the peg and the leather turned up around it is cut and smoothed off to a uniform level surface as the stock is fed forward on the horn to receive the successive pegs.

By the employment of a rotating cutter it will be seen that the operation is the same whatever may be the position of the horn relative to the driving mechanism, and by my improved mechanism I am enabled to drive pegs in a sole channeled both at its inner and outer surfaces, the said channels being turned down after the pegs are all driven to conceal the ends of the said pegs and produce a desirable finish for the inner and outer soles.

The cutter preferably employed consists of an annulus or ring mounted in the end of the horn and encircling the hole into which the awl and pegs are projected, the said ring being provided with cutting teeth or projections at its inner surface, which act upon the side of the projecting leather and peg to cut it off even with the rest of the sole in the line of pegs. As the cutter acts upon the side of the peg, its operation will not depend on the length of the projecting end of the pegs, so that pegs of any length may be used, they being of sufficient length for the thickest part of the stock or sole, and having the surplus length removed by the cutter in the thinner portions of the sole.

Figure 1 is a front elevation of a sufficient portion of a pegging-machine and its horn to illustrate this invention, the end of the horn being broken away to show the cutter in side elevation; Fig. 2, a transverse section, showing also the shoe being operated upon; Fig. 3, a top view of the cutter enlarged, and Fig. 4 a diagram showing the means for actuating the cutter.

A portion of the head or upper portion of the machine, containing the awl or stock-piercing tool, the peg feeding and driving devices, and the mechanism by which they are actuated, is shown at A, the said parts being of any suitable or usual construction, and forming no part of the present invention. The horn *a* has a tip, *b*, and removable cap *c*, both provided with a circular opening, through which the end of the awl and peg project. The said tip and cap are recessed around the said opening, thus affording, when placed together, a cylindrical groove, which receives and serves as a bearing for the rotating cutter *d*, shown in this instance as provided with gear-teeth at its outer periphery meshing with the bevel-pinion *e* at the end of a rod, *f*, actuated through suitable intermediate mechanism, shown in Fig. 4 as a series of shafts, *g*, geared together and provided with a pulley, *h*, driven by a belt from the shaft operating the pegging mechanism. The said cutter *d* is provided at or near its upper edge with inwardly-projecting cutting-teeth 3, which, as the said cutter is rapidly rotated, act with a rasp or saw like effect upon any downwardly-projecting portions of an article moving transversely over the supporting-surface of the horn.

As shown in Fig. 2, the stock is fed in a direction perpendicular to its plane of section, and the projecting end of the peg *i* and the leather forced out by it is cut off by the teeth of the cutter *d* nearly level with the rest of the stock in the line of the pegs.

The inner sole, *k*, and outer sole, *m*, are shown as channeled to receive the pegs, which are driven and cut off with sufficient smoothness to enable the said channels to be turned down evenly, affording a finish nearly equal in appearance to that of the sewed shoe. The guide or gage *n* for the shoe being pegged has its lower portion curved, as shown, to engage the upper in the shank portion of the sole shown in Fig. 2, where the inner sole and upper project beyond or overhang the outer sole.

The peg is shown as twisted longitudinally, and the stock is preferably fed by the lateral movement of the awl while in the stock; but the invention is not limited to any particular construction of the pegging or stock-feeding mechanism.

It is obvious that the cutter $d$ might be actuated by a belt instead of the gear-teeth shown.

I claim—

1. In a pegging or nailing machine, the combination, with the driving mechanism and horn, of a rotary cutting device in the said horn, substantially as described.

2. The combination, with the driving mechanism, of the horn and an annular rotating toothed cutter mounted in the tip of the said horn, substantially as described.

3. The horn and its tip and removable cap-piece, recessed as described, combined with the annular toothed cutter and its actuating-pinion, substantially as described.

In testimony whereof I have signed my name to this specification in the presence of two subscribing witnesses.

GORHAM GRAY.

Witnesses:
  JOS. P. LIVERMORE,
  FRED A. POWELL.